United States Patent [19]

Adamchick

[11] Patent Number: 5,761,668
[45] Date of Patent: Jun. 2, 1998

[54] METHOD AND APPARATUS FOR CONVERTING COMPUTER SOFTWARE AND DATABASES FOR THE YEAR 2000

[76] Inventor: J. David Adamchick, 919 Derbyshire Ave., Mechanicsburg, Pa. 17055

[21] Appl. No.: 741,235

[22] Filed: Oct. 29, 1996

Related U.S. Application Data

[60] Provisional application No. 60/013,076 Mar. 8, 1996.

[51] Int. Cl.⁶ ............................................. G06F 17/30
[52] U.S. Cl. ........................................ 707/101; 707/1
[58] Field of Search ........................ 395/612, 601; 707/101, 1

[56] References Cited

U.S. PATENT DOCUMENTS

| | | | |
|---|---|---|---|
| 2,544,148 | 3/1951 | Flanagan | 40/111 |
| 3,936,966 | 2/1976 | Zeiske | 40/109 |
| 4,233,665 | 11/1980 | Maehashi et al. | 364/715 |
| 5,397,881 | 3/1995 | Mannik | 235/380 |
| 5,485,692 | 1/1996 | Seely, III | 40/114 |
| 5,526,515 | 6/1996 | Ross et al. | 395/550 |
| 5,600,836 | 2/1997 | Alter | 395/612 |
| 5,630,118 | 5/1997 | Shaughnessey | 395/601 |

OTHER PUBLICATIONS

Anonymous, The Year 2000 and 2–Digit Dates: A Guide for Planning and Implementation, IBM, May, 1996, pp. 4–6 through 4–9.

Sullivan, "Ghosts in the Machine", Forbes, 19 Jun. 1995, vol. 155, No. 13, p. 92.

Ainsworth, P., "The Millenniumn Bug", IEE Review, 19 Jul. 1996, vol. 42, No. 4, pp. 140–142.

Hart et al., "A Scaleable, Automated process for Year 2000 System Correction", Proceedings of the 18th international conference on Software Engoneering, 25–30 Mar. 1996, Berlin, Germany., pp. 475–484.

Anonymous, System Rengineering Services, http://www.edsr.eds.com/y2k_html/cogen.html, 21 Jun. 1997, p. 1.

Anonymous, What is Cogen and The Year 2000 Project?, http://www.edsr.eds.com/y2k_html/cogen.html, Jun. 1997.

Anonymous, "Examples of how to Sort All Kinds of Date Fields", http://www.storage.ibm.com/software/sort/srmys-dt.htm, downloaded 21 Jun. 1997.

Anonymous, Data Facility Sort for MVS (DFSORT/MVS), http://www.storage.ibm.com/software/sort/srtmhome.htm, downloaded 21 Jun. 1997, pp. 1–3.

IEE Review, Jul. 1996 "The Millennium Bug" Paul Ainsworth, pp. 140–142.

C. Lawrence Meador, Solving the Year 2000 Problem, Feb. 5, 1996 issue of Information Week.

Doug Bartholomew, Time's Running Out, Feb. 5, 1996 issue of Information Week.

David Baum, Tool Up for 2000, Jan. 1, 1996 issue of Datation.

Joe Celko, Start Fixing Year 2000 Problems Now!, Jan. 1, 1996 issue of Damation.

Pp. 646–647 of IBM Publication *MVS/ESA Programming: Assembler Services Reference*, Jun. 1994 publication.

*Primary Examiner*—Paul R. Lintz
*Attorney, Agent, or Firm*—Webb Ziesenheim Bruening Logsdon Orkin & Hanson, P.C.

[57] ABSTRACT

A method of modifying existing computer software and databases to utilize a date representation which accommodates dates subsequent to Dec. 1, 1999 but preserves the desirable properties of utilizing no more than six numeric characters, is sortable in calendar date order and can be visually interpreted by a human being. The date is represented as CYYDDD, wherein C is indicative of the century, YY is indicative of the year and DDD is indicative of the Julian Day. The software programs which represent or manipulate date information are modified to accommodate this format. The process can be performed by computer to yield converted computer systems which are products of the process.

22 Claims, 4 Drawing Sheets

MILLENNIUM DATE
(SIX NUMERIC CHARACTERS)

STANDARD FORM DATE
(SIX NUMERIC CHARACTERS)

FIGURE 1

(PRIOR ART)

MILLENNIUM DATE (SIX NUMERIC CHARACTERS)

METHOD AND APPARATUS FOR CONVERTING COMPUTER SOFTWARE AND DATABASES FOR THE YEAR 2000

This application claims the benefit under 35 U.S.C. § 119(e) of provisional application Ser. No. 60/013,076 filed on Mar. 8, 1996 now abandoned.

BACKGROUND OF THE INVENTION

1. Field of the Invention

This invention relates to a method and apparatus for converting computer databases and software to accommodate the upcoming change of date from Dec. 31, 1999 to Jan. 1, 2000 and subsequent dates.

2. Background Information

The problem of accommodating calendar dates beyond Dec. 31, 1999 in computer databases and software is known as the Millennium Problem and, prior to the present invention, it has been estimated that businesses and governments will incur a cost of 600 billion dollars worldwide to program the necessary changes.

Figure 1:
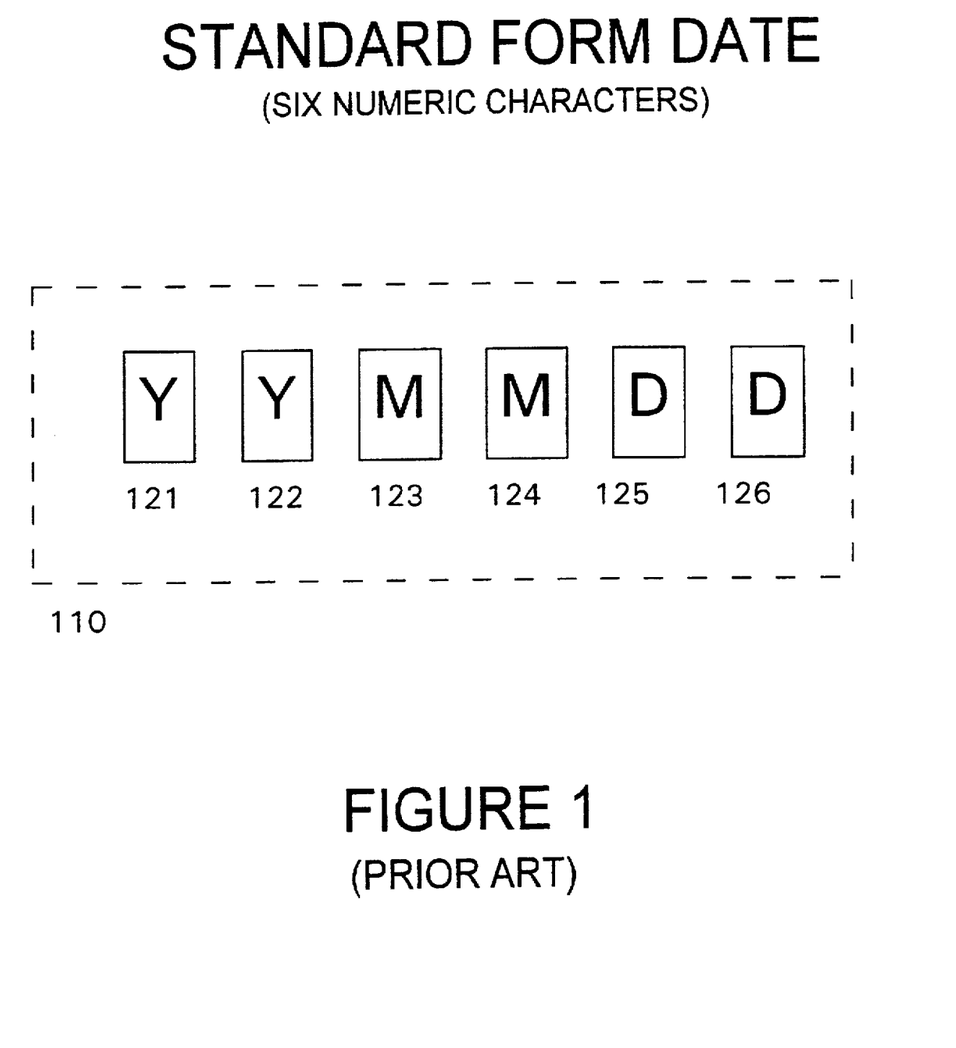
FIG. 1 is an illustration of the prior art six-character Standard Form date as it resides in consecutive characters of a computer memory, either RAM or disk.

The Millennium Problem stems from the fact that much existing computer software represents calendar dates in an abbreviated form in which the year is not expressed in full four-digit form but as two digits only. Numerous abbreviated date formats are known, some of which also incorporate time of day. By far the most common abbreviated date form used in conjunction with computers is the six-digit date YYMMDD (shown as 110 in FIG. 1) in which YY (elements 121 and 122) stands for the last two digits of the four-digit year and is in the range 00–99, MM (elements 123 and 124) stands for the number of the month, which is in the range 01–12, and DD (elements 125 and 126) stands for the number of the day, which is in the range 01–31. For example, May 8, 1996 would be represented as 960508. Throughout the present application, the YYMMDD form will be referred to as the Standard Form.

Some variation of the numerical ranges in the Standard Form may be used to express the fact that certain portions of the date may be unknown. For example, a month code of 00 and a day code of 00 may be used to represent a date that occurs on an unknown day during year YY, such as 960000. Or, a day code of 00 may be used to represent an unknown day in year and month YYMM, that is, an unknown day in May 1996 could be written as 960500. Unknown dates can be made to fall effectively either at the beginning or at the end of a month or year by using either 00 as a code (beginning) or using a month code of 13 or higher or a day code of 32 or higher, though it is typical to use 99 in such a circumstance. That is, an unknown date during April 1996 can also be written as 960499.

The Standard Form exhibits the critically important property that when two calendar dates are compared, either numerically as six-digit numbers or character by character as strings in lexicographic (dictionary) order, the lesser date precedes the greater in chronological time. That is, because 960322 is less than 960816, a computer can determine immediately that Mar. 22, 1996 is earlier than Aug. 16, 1996 by comparing the two calendar date representations. A consequence of this property is that when a list of dates in Standard Form is sorted on a computer, either numerically or in lexicographic order, the dates automatically appear in the sorted list in chronological order also. A calendar date representation that yields a chronologically correct list when used in sorting will be said to possess the Sort Property. The Sort Property is important in simplifying the maintenance of lists of events, such as appointments, expiration dates, due dates, docket entries, waiting lists and the like.

Establishment of a computerized database involves designing the layout of individual records, including their length and division into data fields. Setting up data fields involves choosing a length and format for the fields as well as their positions within the database records. Once a database has been built and maintained over the years, the sizes of its records are not easily changed. In some cases, records are already at the maximum size permitted by a particular computer system and cannot simply be lengthened. In other cases, changing the size of an individual field within a record necessitates massive changes to the software used to manipulate the database. For example, if the calendar date is the first field in a record containing 100 fields, then lengthening the calendar date field will cause all 99 subsequent fields to be shifted to the right, and all software accessing those fields, even if the calendar date itself is never accessed, must be modified to obtain data from a different location in the record. It is, therefore, useful to find a method of solving the Millennium Problem without increasing the length of date fields. A calendar date representation occupying six characters will be said to have the Width Six Property.

It is essential in solving the Millennium Problem to be able to represent calendar dates falling in both the 20th and 21st centuries. (Throughout this specification, the "20th century" refers to years, the leftmost digits of which are "19", even though it is recognized that the year 2000 is technically the last year of the 20th century.) It is also desirable, however, to be able to express calendar dates lying in the 19th century as well as centuries beyond the 21st. For example, in a register of living persons by date of birth, as might be maintained in the pension department of a corporation, there are persons still living who were born in the 19th century (for example, 1895). It is, therefore, important not to lose the ability to record and manipulate such calendar dates. A method of expressing calendar dates that is able to record dates falling in more than two centuries will be said to have the Multi-Century Property.

In many computer systems, fields containing calendar dates have been set up to be numeric only. That is, the individual characters of the date fields may each consist only of the digits 0 through 9. In some cases, this permits a certain efficiency of representation, since the digits 0–9 can be expressed using only four bits, while a general alphanumeric character requires seven or eight bits, depending on the coding sequence (ASCII or EBCDIC) that is being used. In other cases, numeric-only fields are useful as a way of preventing keyboarding errors, if a field is numeric only, then any attempt to enter a non-numeric character, such as the letter "A", can immediately be flagged as erroneous. A calendar date field that consists only of the digits 0–9 will be said to have the Numeric Property.

In many computer applications, database records are viewed directly by human beings, usually on a display terminal or paper printout. It is important for the human reader to be able to interpret the contents of a field without resorting to decoding or decrypting the information therein. For example, a six-character calendar date field on many computers is of size 48 bits (at eight bits per character). A 48-bit field permits the encoding of $2^{48}$ different dates, which is approximately $3 \times 10^{14}$. This number is far greater than the number of days since the apparent birth of the universe, which is about $4 \times 10^{11}$ (taking the age of the universe as ten billion years)—by a factor of nearly 1000. Hence, it is theoretically possible to represent every day that has ever occurred, or ever will, within a six-character field. It is even possible to do so while maintaining the Sort Property, as by numbering the days sequentially beginning with one. However, such a representation requires the use of non-printing and certainly non-numeric characters, some of which may be invalid in character strings on some computer operating systems. Furthermore, the calendar dates in such representations would be completely unintelligible to humans even if they could be printed on paper. We will say that a calendar date representation is "meaningful" to a human being if, immediately upon inspection, he can determine (1) what year the date falls in; (2) approximately when during the year the date falls; and (3) on examining two dates the person can tell immediately which is the earlier. A calendar date representation that is meaningful to a human being will be said to have the Inspection Property.

A common computer calculation performed on calendar dates in the determination of how many days lie in the interval between them, or what calendar date falls a given number of days from a particular calendar date. It is, therefore, desirable to be able to perform arithmetic on calendar dates, in particular, to subtract one calendar date from another and to be able to add or subtract a given number of days from a calendar date. A calendar date representation that facilitates such calculations will be said to have the Arithmetic Property.

A solution to the Millennium Problem that involves altering the representation of calendar dates within a database and/or computer is desired in which such representation possesses:

(1) the Sort Property;
(2) the Width Six Property;
(3) the Multi-Century Property;
(4) the Numeric Property;
(5) the Inspection Property; and
(6) the Arithmetic Property.

Furthermore, it is desirable in any solution to the Millennium Problem that any modifications to existing computer software necessary to accommodate any change to calendar date representation be accomplished in a straightforward, efficient and low-cost manner.

3. Description of the Prior Art

Three methods of dealing with the Millennium Problem are known in the prior art. The first is Date Expansion, in which a six-character date YYMMDD is expanded to the eight-character date YYYYMMDD, where YYYY is the conventional four-digit year date, such as 1996. Expanding the date has all of the desired properties listed above except the Width Six Property and, therefore, has numerous and expensive drawbacks because of large-scale changes to the organization and storage of databases that are consequently necessary.

A second solution is known as Windowing. An arbitrary year during the 20th century is selected, such as 1920. The convention is then adopted that all dates with YY less than 20 will be considered to be in the 21st century, while all dates with YY greater than or equal to 20 will be considered as being in the 20th century. For example, 190718 would stand for Jul. 18, 2019, while 210307 would stand for Mar. 7, 1921. Note that in Windowing a maximum of 100 years can be represented and that the representation depends critically on the year that is chosen to be the breakpoint between centuries. Therefore, computer information files that contain dates based on different breakpoints cannot be shared directly between systems. Windowing preserves the Width Six Property but at the expense of the Sort, Multi-Century and Inspection Properties.

A third solution to the Millennium Problem is to compress more than 100 years of dates into a six-character field. For example, the letter "A" in the leftmost Y position of Standard Form could be used to represent dates in the first decade of the 21st century, that is, A0 through A9 would stand for the years 2000–2009, then the date May 8, 2006 could be written as A60508. A huge number of other encodings exists. However, those that fail to use the digits 0–9 in all six-character positions do not obey the Numeric Property, and most do not possess the Inspection or Arithmetic Properties. In addition, encoding and decoding software must be written to process encoded dates each time they are read from or written to a database. Furthermore, such encoded dates are not readily transferred among computers that use different character sets, since a given character on one machine, such as the letter "A", may have a different binary representation on another, which may affect sorting and arithmetic operations.

Another method of expressing calendar dates in computer systems is the Julian Date. This is a five-character representation in the form YYDDD, where YY is the conventional two-digit year and DDD is the number of days since the beginning of the year, taking January 1 as 001. The representation DDD is also referred to as the Julian Day for a given year. The Julian Date corresponding to May 8, 1996 is 96129. The Julian Date may be extended to include a four-digit date field, in which case May 8, 1996 would be written 1996129, which requires seven digits. The five-digit Julian Date suffers from the same drawbacks as the six-digit Standard Form, while the seven-digit Julian Date exhibits the same encountered drawback when the Standard Form is extended to eight digits.

In summary, no solution to the Millennium Problem is known in the art that preserves all six listed Properties, despite many man-centuries of work in anticipation of the stroke of midnight on Dec. 31, 1999.

SUMMARY OF THE INVENTION

The present invention provides a solution to the Millennium Problem and preserves the six listed Properties. Specifically, the present invention preserves the Sort Property, the Width Six Property, the Multi-Century Property, the Numeric Property, the Inspection Property and the Arithmetic Property. The present invention includes a process of modifying an existing computer system to utilize a calendar date representation which possesses the six desired Properties. The existing computer system will include at least one database stored in a machine-readable storage medium, with the database having at least one record containing at least one date field. Each date field has a representation of a calendar date. The method of the present invention includes the steps of transforming each representation of a calendar date in each computer database of the computer system to a Millennium Date format. The Millennium Date format of the present invention is a six-numerical character field having the format of CYYDDD wherein C is representative of the century, YY is representative of the year, and DDD is representative of the Julian Day. The present invention additionally includes the steps of modifying existing computer software programs, also called applications, of the computer system which represent or manipulate calendar dates to accommodate the Millennium Date format.

The present invention additionally includes the product formed by the process of the present invention. The product may be formed as computer software converted from pre-existing software. The computer software comprises at least one portion which represents or manipulates date information rewritten from the preexisting computer software. Each rewritten portion of the converted computer software accommodates dates in a Millennium Date format. The present invention additionally includes an apparatus for converting existing databases which are stored in a machine-readable storage medium, each database having at least one record containing at least one date field storing a calendar date. The apparatus of the present invention includes a computer programmed for accessing each date field of each record, a computer programmed for obtaining the year, month and day information for each calendar date in each date field, a computer programmed for generating a Millennium Date for each calendar date of each date field, with each Millennium Date in the Millennium Date format, a computer programmed for replacing each date field of each record with the Millennium Date, and a computer programmed to rewrite the record to the storage medium.

These and other advantages of the present invention will be clarified in the description of the preferred embodiment taken together with the attached figures.

DESCRIPTION OF THE INVENTION

The present invention is a method for modifying computer databases and software economically using a date representation that possesses all six of the desired Properties listed above. It encompasses the steps of (1) transforming dates in a computer database into a new form known herein as the Millennium Date (this transformation is shown schematically in FIG. 3); and (2) modifying software programs (shown schematically in FIG. 4) to replace (i) system date routines; (ii) date display routines; (iii) date error-checking routines; (iv) date arithmetic routines; and (v) code that is sensitive to date representation.

The apparatus of the present invention includes a digital computer that has been programmed to convert dates present in a computer database in Standard Form or other date format into Millennium Dates. The present invention further includes a computer memory and a computer disk memory that are organized to hold Millennium Dates.

Figure 2:
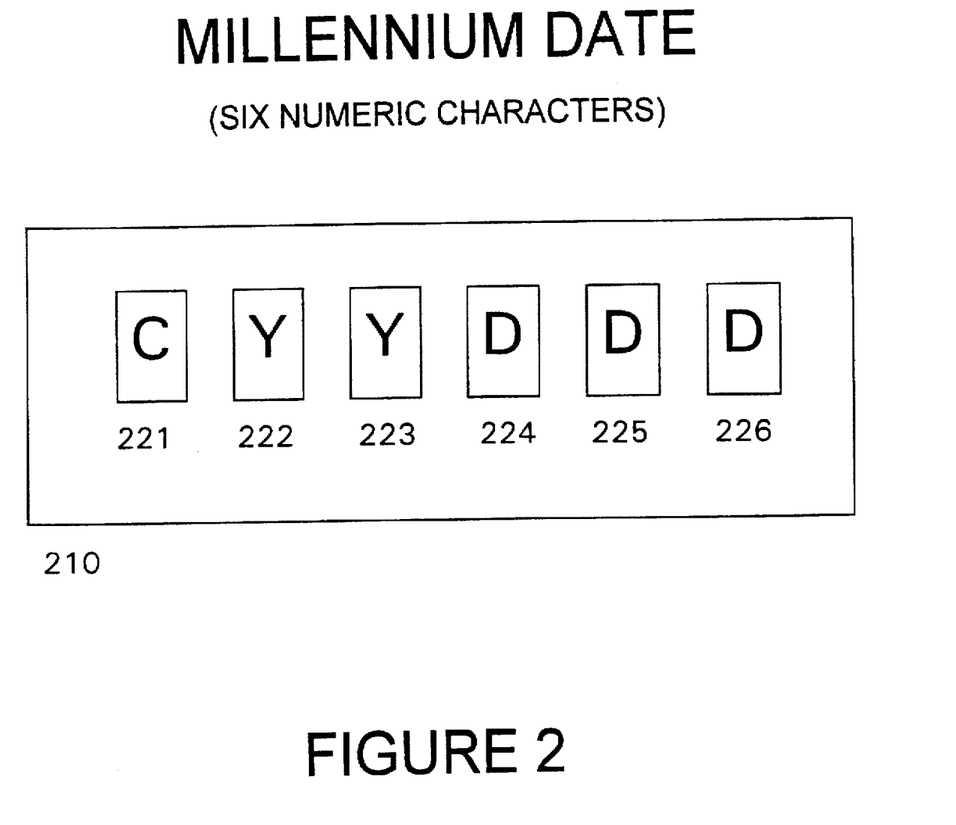
FIG. 2 is an illustration of the six-character Millennium Date of the present invention as it resides in consecutive characters of a computer memory, either RAM or disk.

The Millennium Date of the present invention is a six-character date of the form CYYDDD (shown as 210 in FIG. 2) where C (element 221 in FIG. 2) is a single digit representing a century, with C=0 for the 19th century, C=1 for the 20th century, C=2 for the 21st century, and so forth, up to C=9 for the 28th century; YY (elements 222 and 223 in FIG. 2) are the two rightmost digits of the year, and DDD (elements 224, 225 and 226 in FIG. 2) represents the Julian Day within the year. For C=1 and C=2, C corresponds to the leftmost digit of the year. For example, the date May 8, 1996 would be written in Millennium Date format as 196129, that is the 20th century (C=1), the 96th year (YY=96) and the 129th day (DDD=129). The date May 8, 2000 would be written as 200129.

It is possible to view the Millennium Date as a hybrid Julian Date in which a single high-order digit is added to denote the century. It takes advantage of the fact that the ordinary Julian Date is of width five, so adding a single digit preserves the Width Six Property.

It may also be appreciated that the portion CYY of the Millennium Date is numerically equal to the four-digit year YYYY less 1800. That is, 000 corresponds to the year 1800 and 999 corresponds to the year 2799. The last day of 2799 would be represented as the Millennium Date 999365. This is essentially "Windowing" the year field for one millennium starting from a base of the year 1800.

Figure 3:
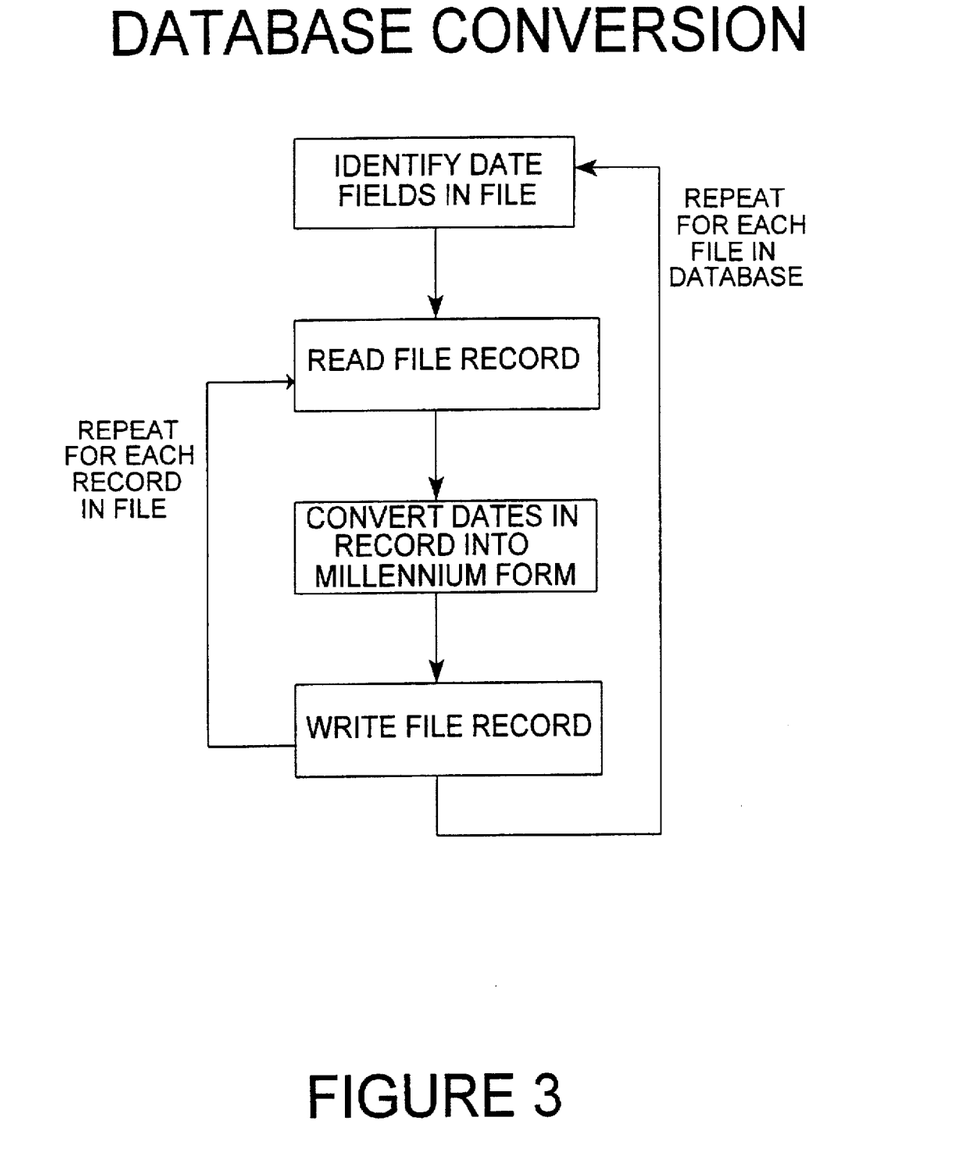
FIG. 3 is a flowchart illustrating the database conversion method of the present invention, intended to be carried out on a computer.

The process of the present invention involves the steps of converting existing databases containing Standard Form dates, or dates in any other format, so that the converted dates are Millennium Dates as is shown in FIG. 3.

It will be apparent to those skilled in the art how this transformation may be accomplished by a computer program. For example, to convert YYMMDD of Standard Form into CYYDDD as a Millennium Date for all dates in the 20th century, we assign C=1, YY=YY and then convert MMDD into the Julian Day DDD by prior art methods, commonly involving a table lookup to determine the day of the year on which the first day of month MM falls (less one) and adding DD, followed by a test to determine whether MM exceeds 02 and whether YY is a leap year. In pseudo code, this calculation may be written:

```
SUBROUTINE SFtoMD(YYMMDD,CYYDDD);
C = 1;
YY = YY;
DDD = FIRSTDAY(MM) + DD - 1;
IF MM > 2 and ISLEAPYEAR(YY) THEN DDD = DDD + 1;
END SFtoMD
```

Since in modern computer systems random-access memory is not at a premium, it is feasible to compute the Julian Day DDD simply by table lookup in an array of dimensions 12×31, as in the statement:

```
DDD = JULIANTABLE(MM,DD);
IF MM > 2 and ISLEAPYEAR(YY) THEN DDD = DDD + 1
```

Likewise, the Millennium Date can easily be converted to Standard Form via table lookup, although some technique such as Windowing will have to be used to represent dates not expressible in Standard Form. The Millennium Date can be converted to an eight-character date YYYYMMDD as follows:

```
SUBROUTINE MDtoSF(CYYDDD,YYYYMMDD);
YYYY = C*100 + 1800 + YY;
MM = JMONTH(DDD);
DD = JDAY(DDD);
END MDtoSF
```

If it is known how to convert between Standard Form and any other particular date format F, it is elementary to convert between F and Millennium Date. F can be converted to a Millennium Date as follows: (1) convert F to Standard Form; and (2) convert Standard Form to Millennium Date by subroutine SFtoMD. A Millennium Date can be converted to format F by (1) converting Millennium Date to eight-digit Standard Form by using subroutine MDtoSF; and (2) converting eight-digit Standard Form to format F.

An existing database using Standard Form dates can be converted easily to use Millennium Date. This is done by (1) identifying those fields in a file that are used to store dates; (2) reading a record of such file into a memory buffer; (3) extracting the Standard Form date(s) from the record; (4) converting the Standard Form date(s) to the corresponding Millennium Date(s) in the buffer; (5) rewriting the record in the database from the buffer; (6) repeating steps (2) through (5) for each record in the file; and (7) repeating steps (1) through (6) for each file in the database. This transformation does not alter the size of any record, nor does it require placing non-numeric data in numeric fields.

The apparatus of the present invention includes a digital computer that has been programmed to convert from Standard Form dates to Millennium Dates as explained above and from Millennium Dates to Standard Form dates and other date formats as explained above.

The apparatus of the present invention further includes a computer random-access memory organized to store Millennium Dates. The apparatus of the present invention further includes a computer disk memory organized to store Millennium Dates.

Figure 4:
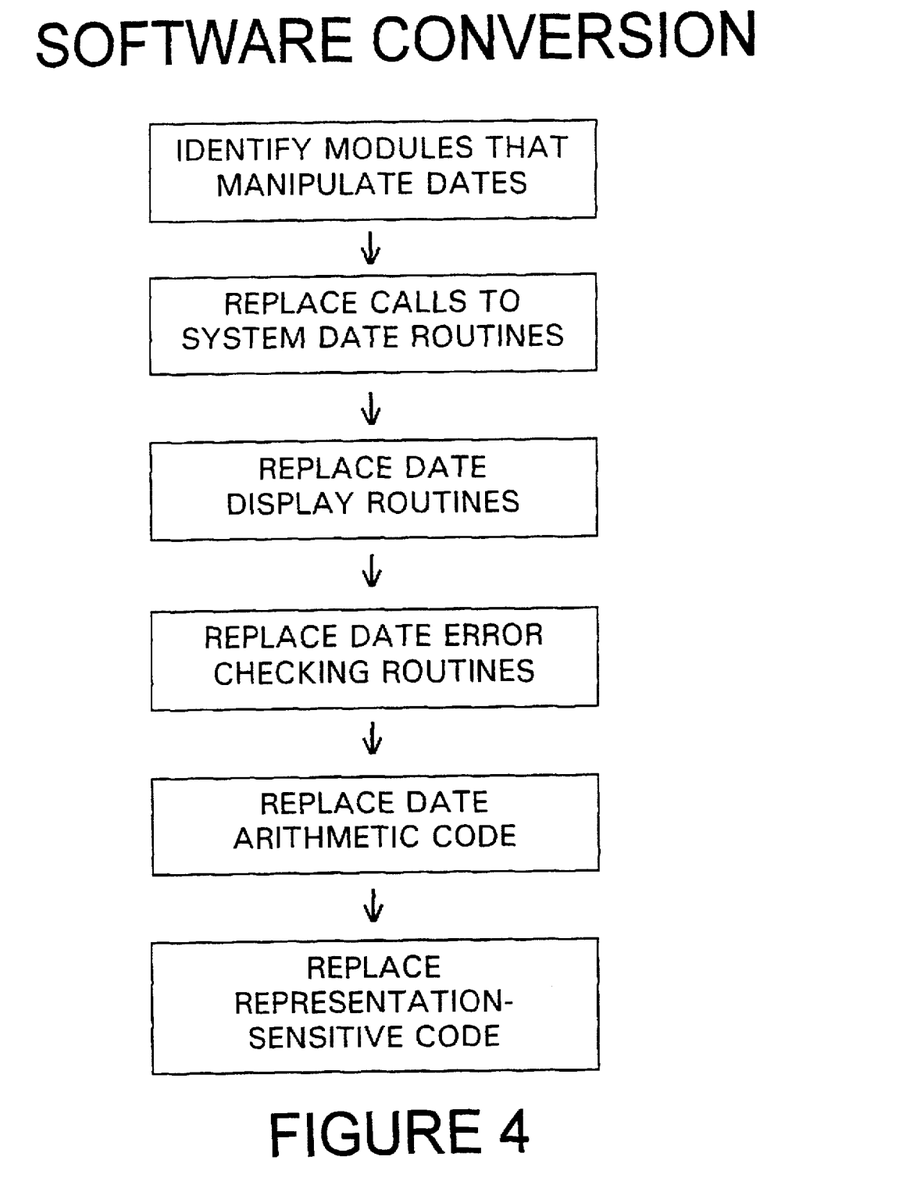
FIG. 4 is a flowchart illustrating the software conversion method of the present invention, intended to be carried out by both computer and manual methods.

The alteration of software that manipulates date records is shown in FIG. 4 and is somewhat more complex and may involve rewriting:

(1) date error checking code;
(2) date display code;
(3) calls to system date routines;
(4) date arithmetic code, including computing the number of days between two dates and adding or subtracting a given number of days from a date; and
(5) code that is sensitive to date representation.

The process of identifying portions of software that represent and manipulate dates involves examining data declarations to determine whether and in what format dates are being stored. Various cues may be used to locate such codes, such as the presence of the strings "DATE," "MONTH," "YEAR," "DY," "DAY," "YR," and the like, numeric picture declarations of length six, and numeric picture declarations of length six with substructure superimposed to permit individual access to the year, month and day portions.

Any software system that is in current use but that is to be modified to accommodate the Millennium Date must permit the entry, display and output of dates subsequent to Dec. 31, 1999. It is possible to select an eight-digit Standard Form for representation internal to a computer program (but not in the database) and provide code to transform the Millennium Date to and from the eight-digit form, then all keyboard input of dates could be performed using eight-digit dates.

It is conventional to provide for error checking, sometimes known as validity checking, of keyboard input to determine whether the characters entered are valid for the field being input. Error checking must be altered to deal with the Millennium Date. For example, a program that verifies that a month is between 01 and 12 by examining the third and fourth characters of the Standard Form will fail when operating on a Millennium Date, in which the third character may be any digit in the range 0–9 but the fourth digit must be in the range 0–3.

Many software systems provide a variety of display formats for dates, such as May 8, 2006, 05/08/2006, 20060508, 8 MAY 2006, and the like. The subroutines that transform an internal representation of a Standard Form date into these varied formats will not function properly when provided with a Millennium Date as input and will have to be rewritten.

Many systems make today's date available to an application program through a simple system call. Unless the operating system can be modified to generate the Millennium Date, extra codes will have to be inserted after each system date call to convert the date retrieved into a Millennium Date.

Programs written in high-level languages that offer a "date" format or picture or provide built-in functions for performing date arithmetic will require modification. These may include utilities for computing the number of days between two dates, the number of workdays between two dates, the day of the week corresponding to a particular date, etc. In general, it is a straightforward matter of programming to transform such programs so they are able to deal with Millennium Dates.

Codes that depend for their correct operation on the particulars of the Standard Form will not necessarily function on databases that have been converted to use the Millennium Date. For example, one may test to determine which calendar quarter a date in Standard Form falls by computing CEILING(MM/3). Since the Millennium Date has no subfield corresponding directly to MM, such a calculation will not be effective after conversion.

It is a benefit of the present invention that no type declarations or data record formats of pictures need to be changed to accommodate the Millennium Date in software that is already programmed to process Standard Form dates. It is a further benefit of the present invention that, after conversion of a database to use Millennium Dates, no software that accesses the database need be modified in any way (including data declaration statements) except that portion of the software that actually manipulates the dates. After conversion to Millennium Dates, no sort routine or sort procedure needs to be modified.

After the software has been converted to accommodate Millennium Dates, it may be re-assembled or re-compiled to produce a new working system suitable for use with dates falling before and after Dec. 31, 1999.

It will be apparent to those of ordinary skill in the art that various modifications may be made to the present invention without departing from the spirit and scope thereof. Consequently, the scope of the present invention is intended to be defined by the appended claims.

What is claimed is:

1. A computer-implemented process of converting an existing computer database stored in a machine-readable storage medium, said database having at least one record containing at least one date field, each said date field having a representation of a calendar date stored therein in a first form, said process comprising the steps of:

a) accessing by computer one said date field of one said record;

b) extracting from said date field a year, month and day corresponding to said calendar date;

c) generating from said year, month and day corresponding to said calendar date a Millennium Date representation corresponding to said calendar date, said Millennium Date representation comprising a six-character representation of said calendar date wherein one character of said six-character representation is representative of a century of said calendar date, two characters of said six-character representation are representative of said year of said calendar date, and three characters of said six-character representation are representative of the Julian Day corresponding to said calendar date;

d) storing said Millennium Date representation in said date field on said storage medium; and e) repeating steps a) through d) for each record of said database.

2. The process of claim 1 wherein each character of said six-character Millennium Date representation is numeric.

3. The process of claim 2 wherein said six-character Millennium Date representation consists of the format:

CYYDDD wherein

C is a numeric character representative of a century of said calendar date,

YY are two numeric characters representative of a year of said calendar date, and DDD are three numeric characters representative of a Julian Day of said calendar date.

4. The process of claim 3 wherein

C ranges over the digits 0 through 9, inclusive, wherein 0 represents the century 1800–1899, 1 represents the century 1900–1999 and 2 represents the century 20002099; and YY ranges over the digits 00 though 99, inclusive, wherein YY equals the two least significant digits of said year.

5. A product formed by the process of claim 1.

6. An apparatus for converting an existing computer database stored in a machine-readable storage medium, said database having at least one record containing at least one date field, each said date field containing a representation of a calendar date, said apparatus comprising:

a) computer means for accessing said database;

b) computer means for obtaining from each said date field a year, month and day corresponding to each said calendar date;

c) computer means for generating a Millennium Date corresponding to each said calendar date, said Millennium Date comprising a six-character representation of said calendar date wherein one character of said six-character representation is representative of a century of said calendar date, two characters of said six-character representation are representative of said year of said calendar date, and three characters of said six-character representation are representative of the Julian Day corresponding to said calendar date; and d) computer means for storing said Millennium Date in each said date field on said storage medium.

7. A process for converting an existing computer application, said computer application representing or manipulating calendar dates, said process comprising the steps of:

a) identifying portions of said software which represent or manipulate said calender dates; and b) rewriting said identified portions to accommodate a representation of said calender dates in a Millennium Date format, said Millennium Date format comprising a six-character representation of said calendar date wherein one character of said six-character representation is representative of a century of said calendar date, two characters of said six-character representation are representative of said year of said calendar date, and three characters of said six-character representation are representative of the Julian Day corresponding to said calendar date.

8. A product formed by the process of claim 7.

9. A program stored in computer memory that has been converted from a preexisting computer program to form a converted program, said preexisting computer program including at least one original portion representing or manipulating calendar dates, said converted program comprising at least one converted portion corresponding to said original portion, each said converted portion accommodating calendar dates in a Millennium Date format, said Millennium Date format including a six-character representation of one said calendar date wherein one character of said six-character representation is representative of a century of said calendar date, two characters of said six-character representation are representative of said year of said calendar date, and three characters of said six-character representation are representative of the Julian Day corresponding to said calendar date.

10. A process for converting an existing computer system having at least one database stored in a machine-readable storage medium, said database having at least one record containing at least one date field, each said date field containing a calendar date, said computer system further having computer software which represents or manipulates calendar dates, said process comprising the steps of:

a) accessing by computer one said date field of one said record;

b) obtaining from said date field a year, month and day corresponding to said calendar date;

c) generating a Millennium Date corresponding to said calendar date, said Millennium Date comprising a six-character representation of said calendar date wherein one character of said six-character representation is representative of a century of said calendar date, two characters of said six-character representation are representative of said year of said calendar date, and three characters of said six-character representation are representative of the Julian Day corresponding to said calendar date;

d) replacing said calendar date of said date field on said storage medium with said Millennium Date;

e) repeating steps a) through d) for each record of said database;

f) identifying portions of said computer software that represent or manipulate calendar dates; and g) rewriting said identified portions to accommodate said Millennium Dates.

11. The process of claim 10 wherein each character of said six-character representation is numeric.

12. The process of claim 11 wherein said six-character representation consists of the format:

CYYDDD wherein

C is a numeric character representative of a century of said calendar date,

YY are two numeric characters representative of a year of said calendar date, and DDD are three numeric characters representative of a Julian Day of said calendar date.

13. The process of claim 12 wherein

C ranges over the digits 0 through 9, inclusive, wherein 0 represents the century 1800–1899, 1 represents the century 1900–1999 and 2 represents the century 2000–2999; and YY ranges over the digits 00 though 99, inclusive, wherein YY equals the two least significant digits of said year.

14. A product formed by the process of claim 10.

15. A computer system that has been converted from a preexisting computer system to form a converted computer system, said preexisting computer system including a preexisting database stored in a machine-readable storage medium, said preexisting database having at least one record containing at least one calendar date, said preexisting computer system further having preexisting computer software which represents or manipulates calendar dates, said converted computer system comprising:

a) at least one database stored on a machine-readable storage medium, said database having been converted from said preexisting database to form a converted database, said converted database having at least one record containing at least one calendar date in Millennium Date format, said Millennium Date format including a six-character representation of said calendar date wherein one character of said six-character representation is representative of a century of said calendar date, two characters of said six-character representation are representative of said year of said calendar date, and three characters of said six-character representation are representative of the Julian Day corresponding to said calendar date; and b) computer software that has been converted from said preexisting software to form converted software, said converted software accommodating calendar dates in said Millennium Date format.

16. A computerized method of data compression for compressing a given calendar date into a date field stored on a machine-readable storage medium to form a compressed date having six numeric characters, said method comprising the steps of:

a) assigning a first character of said compressed date to be indicative of a century of said calendar date;

b) assigning second and third characters of said compressed date to be indicative of a year of said calendar date;

c) assigning fourth, fifth and sixth characters of said compressed date to be indicative of the Julian Day corresponding to said calendar date; and d) writing said compressed date onto said storage medium.

17. The method of claim 16, wherein said compressed date possesses the Sort Property, the Width Six Property, the Multi-Century Property, the Numeric Property, the Inspection Property and the Arithmetic Property.

18. A computerized process of converting a calendar date stored as an original date field in a machine-readable storage medium to form a converted date field, wherein said converted date field possesses the Sort Property, the Width Six Property, the Multi-Century Property, the Numeric Property, the Inspection Property and the Arithmetic Property, said process comprising the steps of:

a) accessing by computer said original date field;

b) obtaining from said original date field a year, month and day corresponding to said calendar date;

c) generating by computer a Millennium Date in the six-character format:
CYYDDD
wherein
C is a numeric character representative of a century of said calendar date,
YY are two numeric characters representative of a year of said calendar date, and
DDD are three numeric characters representative of a Julian Day of said calendar date; and d) replacing said original date field on said storage medium with said Millennium Date.

19. A product made by the process of claim 18.

20. An apparatus for converting a calendar date stored as an original date field in a machine-readable storage medium to form a converted date field, wherein said converted date field possesses the Sort Property, the Width Six Property, the Multi-Century Property, the Numeric Property, the Inspection Property and the Arithmetic Property, said apparatus comprising:

a) computer means for accessing said original date field;

b) computer means for obtaining from said original date field a year, month and day corresponding to said calendar date;

c) computer means for generating a Millennium Date in the six-character format:
CYYDDD
wherein
C is a numeric character representative of a century of said calendar date,
YY are two numeric characters representative of a year of said calendar date, and
DDD are three numeric characters representative of a Julian Day of said calendar date; and d) computer means for replacing said original date field on said storage medium with said Millennium Date.

21. A method of modifying a preexisting computer system to form a converted computer system, said preexisting computer system having a database stored on a machine-readable storage medium, said preexisting computer system having software for manipulating calendar dates, said converted computer system utilizing a date representation which possesses the Sort Property, the Width Six Property, the Multi-Century Property, the Numeric Property, the Inspection Property and the Arithmetic Property, said method comprising the steps of:

a) transforming each date in said database to a Millennium Date having the format:
CYYDDD
wherein
C is a numeric character representative of a century of said calendar date,
YY are two numeric characters representative of a year of said calendar date, and
DDD are three numeric characters representative of a Julian Day of said calendar date; and b) modifying said software to accommodate said Millennium Date format.

22. A computer-implemented method of maintaining a database having records with date fields in the Standard Form format to have the ability to add additional records with data stored in said date fields representative of calendar dates in the year 2000 or beyond, said method comprising the steps of:

a) converting the data in existing date fields to the Millennium Date format;

b) adding records with data in the Millennium Date format in said date fields representative of dates in the year 2000 or beyond; and c) sorting the records in the database based upon the date field using existing sort routines.

* * * * *